No. 750,190. PATENTED JAN. 19, 1904.
J. HENAULT.
COOKING DEVICE.
APPLICATION FILED SEPT. 23, 1903.
NO MODEL. 2 SHEETS—SHEET 1.
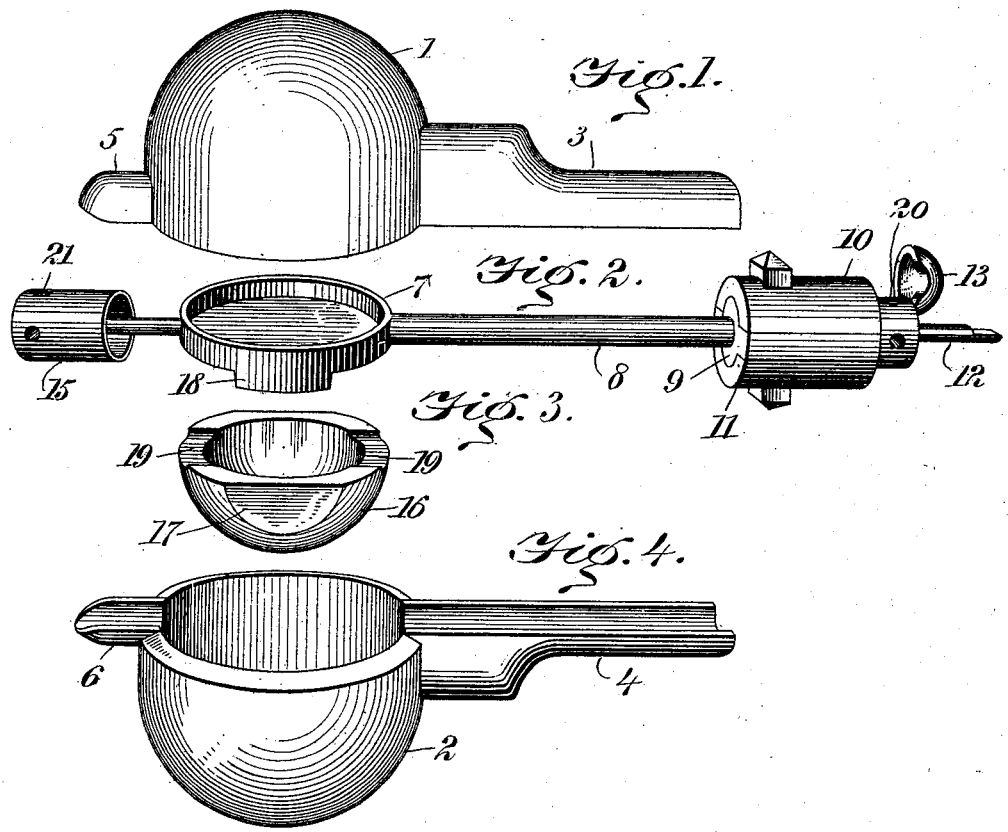
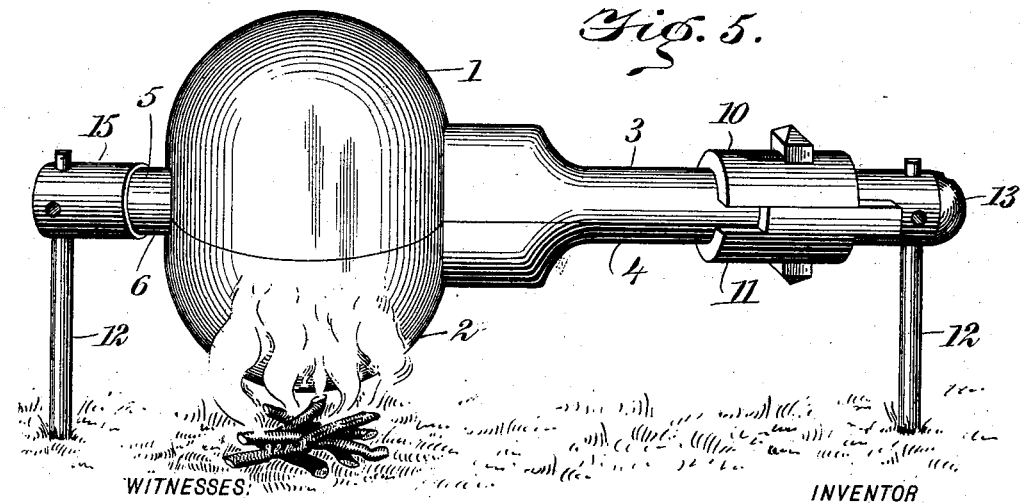
WITNESSES:
N. C. Abbott
C. R. Ferguson
INVENTOR
Joseph Henault
BY
Munn
ATTORNEYS

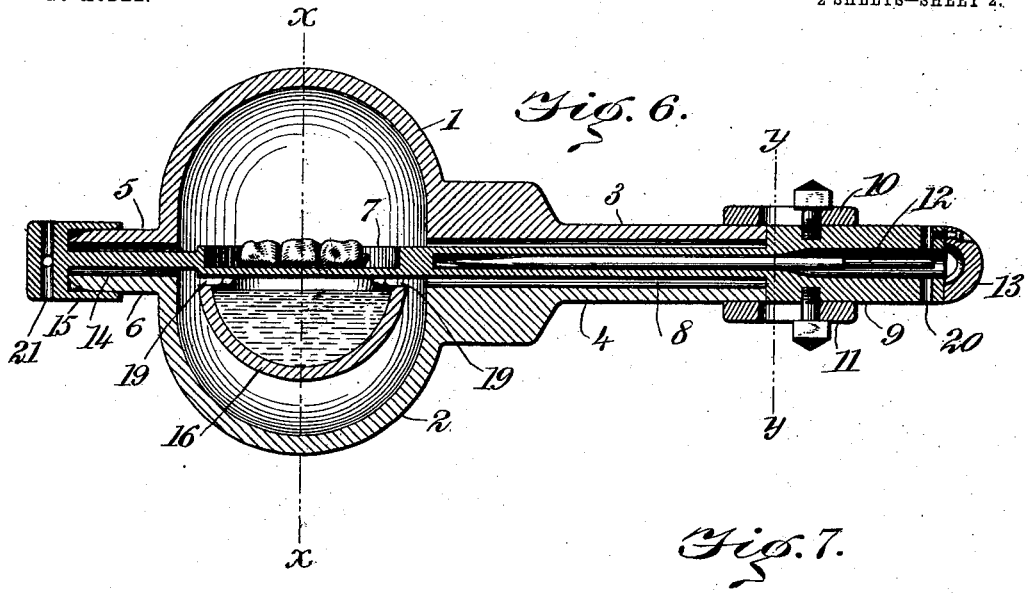

No. 750,190. Patented January 19, 1904.

UNITED STATES PATENT OFFICE.

JOSEPH HENAULT, OF LOS ANGELES, CALIFORNIA.

COOKING DEVICE.

SPECIFICATION forming part of Letters Patent No. 750,190, dated January 19, 1904.

Application filed September 23, 1903. Serial No. 174,305. (No model.)

*To all whom it may concern:*

Be it known that I, JOSEPH HENAULT, a citizen of the United States, and a resident of Los Angeles, in the county of Los Angeles and State of California, have invented a new and Improved Cooking Device, of which the following is a full, clear, and exact description.

The invention relates to improvements in cooking devices, an object being to provide a cooking device particularly adapted for camping purposes and by means of which various articles of food may be readily fried, baked, or otherwise cooked.

I will describe a cooking device embodying my invention and then point out the novel features in the appended claims.

Reference is to be had to the accompanying drawings, forming a part of this specification, in which similar characters of reference indicate corresponding parts in all the figures.

Figures 1, 2, 3, and 4 are perspective views showing the various parts of a cooking device embodying my invention. Fig. 5 is a side view illustrating the device as in use. Fig. 6 is a longitudinal section thereof. Fig. 7 is a section on the line $x\ x$ of Fig. 6, and Fig. 8 is a section on the line $y\ y$ of Fig. 6.

The device comprises a bowl-shaped upper section 1 and a similarly-shaped lower section 2, which when placed together practically form a closed oven or cooking-chamber. At one side the section 1 has an outwardly-extended member 3 and the section 2 has an outwardly-extended member 4. These two members are trough-shaped or hollowed out at the inner side, so that when placed together a tube is formed. At the opposite side the section 1 has a short projection 5 and the section 2 has a short projection 6. These projections are hollowed out or may be trough-shaped at the inner side, so as to form a tube when placed together.

Arranged to be placed in the sections 1 2 is a pan 7, in which food to be cooked may be placed. At one side of the pan is a handle or projection 8, designed to pass into the opening formed by the extensions 3 4. The outer end of this handle 8 has an enlarged portion 9 the diameter of which is substantially the same as the diameter of the combined parts 3 4. As a means for locking the extension 3 in position I employ a segmental plate 10, designed to slide on the enlarged portion 9 of the handle and upon said extension 3, and a similar plate 11 has sliding connection with the handle to engage with the extension 4. It will be noted that these plates 10 11 are slotted, and screws pass through the slots into the handle. The handle is here shown as made tubular, so that supporting legs or rods 12 may be placed therein when not desired for use, and they are held from outward movement by means of a swinging cover 13. At the side opposite the handle 8 the pan 7 has an extension 14, to which is attached a socket member 15 for receiving the projections 5 6.

Adapted to be supported on the under side of the pan 7 is a water-bowl 16. As here shown, the water-bowl has flat opposite sides 17, which are flared outward and upward and are designed to engage in undercut slideways 18 formed on the under side of the pan. The said bowl 16 has opposite openings 19, through which steam may pass.

In using the device while in camp or over a fire built on the ground the rods or legs 12 are to be forced into the ground, the upper end of one rod passing through an opening 20 in the enlarged portion 9 of the handle and the upper end of the other rod passing through an opening 21, formed in the socket member 15, and after the parts 1 2 are placed in position as indicated the device is ready for use. Meat or other food may be readily fried in the pan 7, or bread may be baked therein, the steam from the water in the bowl 16 providing suitable moisture for the loaf.

It is quite obvious that the device is not necessarily confined to out-of-door or camping use, as it may be placed in the opening of a stove or range.

When not employed for cooking purposes, as above described, the members or sections 1 2 may be used as saucepans and the bowl 16 as a drinking or mixing cup.

Having thus described my invention, I claim as new and desire to secure by Letters Patent—

1. A cooking device comprising two substantially bowl-shaped sections adapted when placed together to form an oven or cooking-chamber, projections from opposite sides of the sections and means for engaging with said projections and removably connecting the sections together.

2. A cooking device comprising two substantially bowl-shaped members, forming a chamber or oven, extensions from opposite sides of said members, the said extensions being hollowed at the inner side, a pan adapted to be arranged in the chamber or oven, an extension from one side of said pan for passing into the hollow of the extensions at one side, a projection from the other side of said pan for passing through the hollow of the projection of said side of the oven-sections, and means for locking the parts together.

3. A cooking device comprising two substantially bowl-shaped sections adapted to be placed together to form a closed oven or cooking-chamber, a pan adapted to be arranged therein, a handle extended from one side of the pan, projections from the oven, members between which said handle passes, said handle having an enlarged portion, sliding plates on the enlarged portion for engaging with said extensions of the oven, a projection on the opposite side of said pan, a socket member on said projection, and extensions from the oven-sections for engaging around said projection and in said socket member.

4. A cooking device comprising two bowl-shaped members adapted to be removably secured together, a pan adapted to be placed in said members, a tubular handle for said pan being extended outward from said members, and supporting-legs designed to be placed in the tubular handle when not in use.

5. A cooking device comprising two substantially bowl-shaped members which when placed together form an oven or cooking-chamber, a pan adapted to be placed in said oven or cooking-chamber, a tubular handle on the pan, supporting-legs adapted to be placed in the tubular handle when not in use and a water-holder supported by said pan.

6. A cooking device comprising two bowl-shaped members adapted to be removably secured together, a pan designed to be placed in the oven or chamber formed by said members, a tubular handle on the pan, supporting-legs adapted to be placed therein and a water-holder having removable connection with said pan.

In testimony whereof I have signed my name to this specification in the presence of two subscribing witnesses.

JOSEPH HENAULT.

Witnesses:
JOHN FAY,
A. W. MAY.